(No Model.)
D. TUFTS.
SLIDE VALVE.
No. 342,055. Patented May 18, 1886.
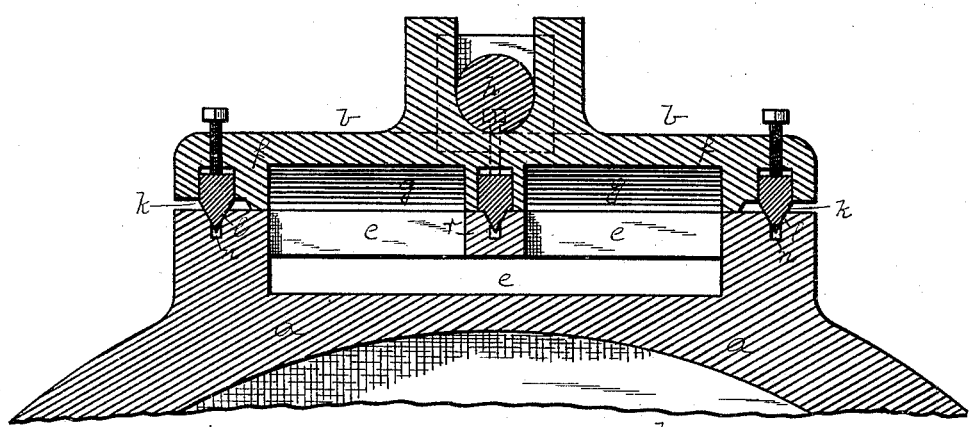
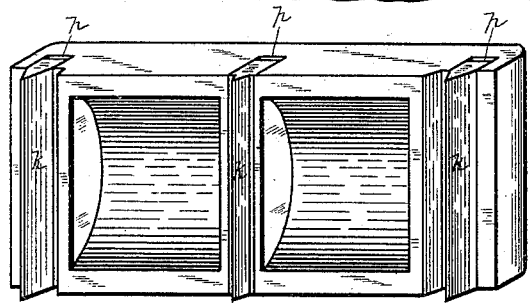
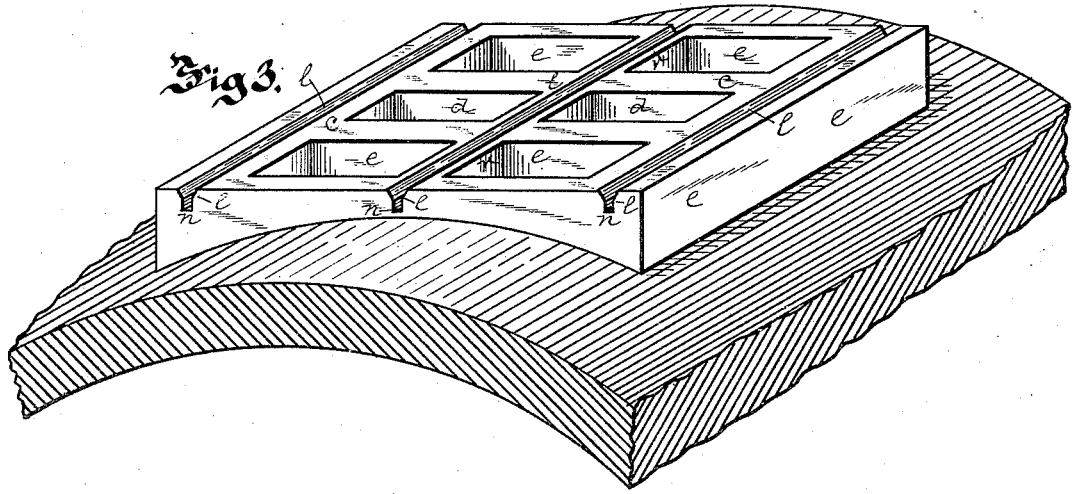
Witnesses:
W. C. Chaffee
A. C. Rawlings
Inventor.
David Tufts
By James F. Ray
Attorney

UNITED STATES PATENT OFFICE.

DAVID TUFTS, OF PITTSBURG, PENNSYLVANIA.

SLIDE-VALVE.

SPECIFICATION forming part of Letters Patent No. 342,055, dated May 18, 1886.

Application filed December 4, 1885. Serial No. 184,658. (No model.)

*To all whom it may concern:*

Be it known that I, DAVID TUFTS, of Pittsburg, in the county of Allegheny and State of Pennsylvania, have invented a new and useful Improvement in Slide-Valves; and I do hereby declare the following to be a full, clear, and exact description thereof.

My invention relates to the slide-valves of steam and similar engines, its object being to improve the slide-valve shown and described in application for Letters Patent filed by me October 6, 1885, Serial No. 179,107. In that application the invention consists, generally, in a slide-valve having a tongue-and-groove joint formed on the faces of the slide-valve and port-seat at each side of the ports, the purpose of the invention being to guide the movement of the slide-valve over the port-seat and prevent the wabbling thereof; to relieve the pressure between the faces of the slide-valve and port-seat, and thus reduce the friction; to reduce the force necessary in reversing the valve, and to overcome friction and wear between the faces of the valve and prevent the dishing of said faces. In my improved slide-valve, as shown in said application, the tongues were formed integral with the slide-valve or the port-seat, and it required very delicate and perfect work to adjust them perfectly, so as to obtain all the desired results. Provision was made for the reception of grit at the base of the grooves by removing the apex of the tongues, thus leaving a space at the base of the grooves. It was also found desirable in large slide-valves to form some means of support for the valve between the sides thereof; and the objects of my invention are to improve the slide-valve as shown in my former application in these particulars.

It therefore consists, first, in forming the tongue of the tongue-and groove joints formed on the faces of the slide-valve and port-seat adjustable, so that the same may be adjusted to obtain the proper bearing between the flat faces of the slide-valve and port-seat to form a perfectly steam-tight joint and yet overcome friction and wear, as above described, while at the same time I overcome all necessity for the planing or facing of the slide-valve and port-seat in case of special wear at the tongue-and-groove joint.

It also consists in forming the groove of the tongue-and-groove joint Y-shaped, there being the ordinary V-shaped or tapered tongue-and-groove joint and a recess or channel extending down at the base of the groove, which channel will serve more perfectly to hold the body of oil suitable for lubricating the joint and at the same time form sufficient space to receive any grit which may be carried into the groove, either by the oil employed for lubricating or in other way.

It also consists in providing the valve with a tongue-and-groove joint between the sides thereof extending across the port-seat to support the slide-valve where large slide-valves are employed.

To enable others skilled in the art to make and use my invention, I will describe the same more fully, referring to the accompanying drawings, in which—

Figure 1 is a cross-section illustrating my invention, and Figs. 2 and 3 are perspective views of the slide-valve and port-seats, respectively, illustrating the same.

Like letters of reference indicate like parts in each.

In the accompanying drawings, the cylinder *a* and the steam-chest *b* are of the ordinary construction, the port-seat *c* being formed in the same manner as in the ordinary engine, and having therein the exhaust-port *d* and the supply-ports *e*, the exhaust-port leading off in any suitable manner for carrying away the exhaust-steam and the supply-ports leading to the ends of the steam-cylinder as in the ordinary steam-engine.

Resting on the port-seat *c* is the slide-valve *f*, this slide-valve having therein the recess *g*, by means of which communication is formed between the supply-ports and the exhaust-port, the slide-valve being connected in any suitable manner with the valve-rod *h*, which extends through a suitable stuffing-box at one end of the steam-chest, and is connected to the ordinary cam or other means of reciprocating the valve.

Formed on the faces of the port-seats, at the sides of the ports therein, are the grooves *l*, into which enter the tongues *k* on the face of the slide-valve, the tongues *k* being V-shaped in cross-section, as shown, and the upper portion of the groove being also V-shaped, while at the base of the grooves *l* is the channel *n*, thus forming a Y-groove instead of a V-groove, the tongue pressing upon the tapering faces at the upper part of this groove, and its apex extending down a short distance into the recess or channel $n$ of the groove, there being below the tongue a full space to receive any grit or other foreign substance which might find its way into the valve-seat, and as the groove is closed at each end, the extension thereof serving to hold a large body of the lubricating-oil and overcome the necessity of frequent lubrication.

The tongues $k$ are formed adjustable, the recess $p$ being formed in the face of the slide-valve and the tongue fitting into said recess and being adjusted therein by any suitable means, that shown in the drawings being the ordinary set-screw.

Where my invention is employed with slide-valves having wide faces, in order to distribute the weight of the slide-valve upon the port-seat, I prefer to employ one or more tongue-and-groove joints extending across the ports in the port-seat and the recess of the slide-valve. This is fully shown in the drawings, there being a rib cast across the ports of the port-seats, as at $r$, and the groove being formed in this rib, while the tongue can be supported either by a similar rib extending across the recess $g$ of the slide-valve or by the walls of the slide-valve at each end of the recess. By the employment of this tongue-and-groove joint between the side tongue-and-groove joints above described, and the employment of the adjustable tongues in these joints, a very delicate adjustment of the slide-valve upon the port-seat can be obtained, and one in which the friction is reduced to a minimum, and a perfectly steam-tight joint between the faces of the slide-valve and port-seat obtained, while at the same time the necessity for planing or facing the faces of the slide-valve and port-seat in case of wear of the tongues and grooves is entirely overcome and a more perfect lubrication of the tongue-and-groove joint is obtained, all liability of the wearing of the same from grit being done away with, as free space for the reception of such grit or foreign substance is formed at the base of the groove by means of the extension $n$, the advantages of the Y-shaped groove being apparent.

What I claim as my invention, and desire to secure by Letters Patent, is—

1. In slide-valves for steam-engines, a tongue-and-groove joint formed in the faces of the slide-valve and port-seat, and having the tongued portion thereof adjustable, substantially as and for the purposes set forth.

2. In slide-valves for steam-engines, the combination, with the tapering or V-shaped tongue, of the Y-shaped groove for the reception thereof, said tongue-and-groove joints being formed on the faces of the slide-valve and port-seat, substantially as and for the purposes set forth.

3. In slide-valves for steam-engines, the combination, with tongue-and-groove joints formed on the faces of the slide-valve and port-seat at each side of the ports, of the tongue-and-groove joint extending across the ports of the port-seats, substantially as and for the purposes set forth.

In testimony whereof I, the said DAVID TUFTS, have hereunto set my hand.

DAVID TUFTS.

Witnesses:
 JAMES I. KAY,
 J. N. COOKE.